United States Patent [19]

Shibata et al.

[11] 4,250,939
[45] Feb. 17, 1981

[54] SUPER RIGID RUBBER COMPOSITION AND A TIRE USING THE SAME

[75] Inventors: Shoson Shibata, Tokyo; Akio Sato, Higashi-Murayama; Yoshihiro Hayakawa, Akigawa; Fumio Bamba, Mitaka, all of Japan

[73] Assignee: Bridgestone Tire Company Limited, Tokyo, Japan

[21] Appl. No.: 951,815

[22] Filed: Oct. 16, 1978

Related U.S. Application Data

[62] Division of Ser. No. 812,073, Jul. 1, 1977, abandoned.

[30] Foreign Application Priority Data

Jul. 1, 1976 [JP]   Japan ................................. 51/77075

[51] Int. Cl.³ .............................................. B60C 15/06
[52] U.S. Cl. .................................... 152/362 R; 260/3; 152/354 R; 525/139
[58] Field of Search .......................... 152/362 R, 354 R; 260/3, 845, 846; 525/139

[56] References Cited

U.S. PATENT DOCUMENTS

| | | | |
|---|---|---|---|
| 3,250,733 | 5/1966 | Giller | 260/846 X |
| 3,342,238 | 9/1967 | Weinstock et al. | 260/846 X |
| 3,474,065 | 10/1969 | Gburek et al. | 260/846 X |
| 3,638,702 | 2/1972 | Endter | 260/846 X |
| 3,738,948 | 6/1973 | Dunnom | 260/846 X |
| 3,817,976 | 6/1974 | Bakul et al. | 260/846 X |
| 3,921,690 | 11/1975 | Edwards | 152/362 R |
| 4,024,901 | 5/1977 | Poque | 152/354 |
| 4,046,183 | 9/1977 | Takahashi et al. | 152/354 X |
| 4,067,373 | 1/1978 | Delobelle et al. | 152/354 R |

OTHER PUBLICATIONS

Materials and Compounding Ingredients for Rubber, 1975, Bill Communications, New York, N. Y.

*Primary Examiner*—Wilbert J. Briggs, Sr.
*Attorney, Agent, or Firm*—Sughrue, Rothwell, Mion, Zinn and Macpeak

[57] ABSTRACT

A rubber composition comprising a sulfur-vulcanizable rubber, N,N'-dithiodiamine, a thermosetting resin and a curing agent has a high dynamic modulus in the vulcanizate. A tire using the vulcanizate as a bead filler rubber has improved impact absorbing property and vibration damping property and is excellent in the ride feeling.

8 Claims, 1 Drawing Figure

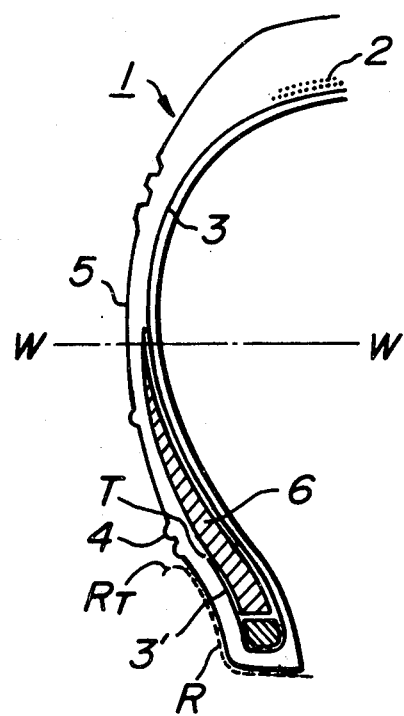

SUPER RIGID RUBBER COMPOSITION AND A TIRE USING THE SAME

This is a Division of application Ser. No. 812,073, filed July 1, 1977, now abandoned.

BACKGROUND OF THE INVENTION

The present invention relates to a super rigid rubber composition and a tire using the rubber composition, and more particularly relates to a super rigid rubber composition comprising a sulfur-vulcanizable rubber, N,N'-dithiodiamine or its derivative, a thermosetting resin and a curing agent, and a tire using the rubber composition as a tire part.

The inventors have made basic investigations for tire and found out that the use of a vulcanized rubber having a dynamic modulus of not less than 300 kg/cm$^2$, preferably 500–1,500 kg/cm$^2$, more preferably 700–1,500 kg/cm$^2$, as a tire part, particularly as a bead filler rubber of a tire, improves remarkably the performance of the tire, and have further made various investigations in order to obtain a vulcanized rubber having such high modulus (hereinafter, such rubber is referred to as super rigid rubber).

In general, commonly used vulcanized rubbers have a dynamic modulus of about 20–100 kg/cm$^2$, and the commercial production of vulcanized rubbers having a dynamic modulus of higher than about 100 kg/cm$^2$ has various problems in the workability and processability. For example, a large amount of heat is generated due to the high rigidty of the rubber at the kneading in a Banbury mixer. Moreover, since a large amount of vulcanizer or vulcanization accelerator is used in order to increase the dynamic modulus of a rubber, the rubber scorches and an overload is subjected to the Banbury mixer. Further, when the rubber is extruded through a nozzle of an extruder, the nozzle is damaged due to the high rigidity and viscosity of the rubber or the rubber scorches, and the commerical production of the rubber is substantially impossible.

SUMMARY OF THE INVENTION

An object of the present invention is to provide a super rigid rubber composition which can eliminate the above described drawbacks and can prolong a scorch time, lower the viscosity and hence suppress heat generation at the kneading and extrusion, and prevent a Banbury mixer and an extruder from being subjected to overload and also prevent the scorching.

Another object of the present invention is to improve various performances of a tire by the use of the above described super rigid rubber composition.

BRIEF DESCRIPTION OF THE DRAWING

The single FIGURE is a partial cross-sectional view in a direction perpendicular to the equatorial plane of a tire according to the present invention.

DESCRIPTION OF THE PREFERRED EMBODIMENTS

The inventors have found that, when a rubber composition comprising a sulfur-vulcanizable rubber selected from the group consisting of natural rubber, diene series rubber, diene series copolymer rubber and rubber blends thereof in an optional mixing ratio, N,N'-dithiodiamine or its derivative, which is used in addition to elementary sulfur and is represented by the following general formula

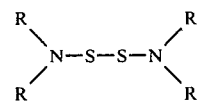

wherein

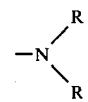

represents an alkylamino, arylamino, aralkyamino, cycloalkylamino, cyanoalkylamino, cyanocycloalkylamino or heterocycloamino group having 1–16 carbon atoms, a thermosetting resin and a curing agent is vulcanized, the vulcanizate has a dynamic modulus of not less than 300 kg/cm$^2$, and has not the above described drawbacks in the conventional rubbers having a high dynamic modulus.

That is, the first aspect of the present invention is the provision of a super rigid rubber composition comprising the above described sulfur-vulcanizable rubber, the above described N,N'-dithiodiamine or its derivative as a vulcanizer in addition to elementary sulfur, a thermosetting resin and a curing agent.

The sulfur-vulcanizable rubber to be used as a basic component of the rubber composition according to the present invention includes the above described natural rubber, diene series rubber, diene series copolymer rubber and rubber blends thereof in an optional mixing ratio. Among them, natural rubber, cis-1,4-polybutadiene, cis-1,4-polyisoprene, styrene-butadiene copolymer and rubber blends thereof in an optional mixing ratio are preferable. Further, natural rubber, cis-1,4-polybutadiene and rubber blends thereof in an optional mixing ratio are particularly preferable.

The N,N'-dithiodiamine and its derivatives to be used in the present invention include N,N'-dithio-bis(diethylamine), N,N'-dithio-bis(diisopropylamine), N,N'-dithio-bis(dibutylamine), N,N'-dithio-bis(dioctylamine), N,N'-dithio-bis(n-butylaminoacetonitrile), N,N'-dithio-bis(β-ethylaminopropionitrile), N,N'-dithio-bis(β-isopropylaminopropionitrile), N,N'-dithio-bis(butylaminopropionitrile), N,N'-dithio-bis(β-cyclohexylaminopropionitrile), N,N'-dithio-bis(cyclohexylaminoacetonitrile), N,N'-dithio-bis(pyrrolidine), N,N'dithio-bis(piperidine), N,N'-dithio-bis(pipecolidine), N,N'-dithio-bis(morpholine), N,N'-dithio-bis(N-cyclohexyltetrahydrofurfurylamine), N,N'-dithio-bis(N-n-butyltetrahydrofurfurylamine), N,N'-dithio-bis(phenylethylamine), N,N'-dithio-bis(phenylmethylamine) and the like. Among them, N,N'-dithio-bis(morpholine), N,N'-dithio-bis(β-isopropylaminopropionitrile), N,N'-dithio-bis(n-butylaminopropionitrile), N,N'-dithio-bis(cyclohexylaminoacetonitrile), N,N'-dithio-bis(phenylethylamine), N,N'-dithio-bis(phenylmethylamine) and the like are preferable. Further, N,N'-dithio-bis(morpholine) is particularly preferable. The above described N,N'-dithiodiamine or its derivative is an indispensable component in the present invention together with the thermosetting resin and curing agent described later. When the N,N'-dithiodiamine is not used, the resulting rubber composition is short in the scorch time and is poor in the workability and processibility, and it is difficult to improve the sulfur-crosslinkage density by suppressing the blooming of sulfur. The N,N'-dithiodiamine is generally used in an amount of 0.1–8 parts by weight, preferably 0.5–6 parts by weight, based on 100 parts by weight of rubber. When the amount of the diamine is less than 0.1 part by weight, the effect of the diamine does not appear. While, when the amount exceeds 8 parts by weight, the sulfur-crosslinkage density becomes excessively high, and the vulcanizate is very low in the strength and elongation at break and in the tear strength, and cannot be used for practical purpose.

The thermosetting resin to be used in the present invention includes any resins, which are cured by heat, for example, phenolic resin, cresol resin, cashew-modified phenolic resin, cashew-modified cresol resin, cresol-modified phenolic resin, phenolic or cresol resin modified by oils of linoleic acid, linolenic acid, oleic acid and other acids, phenolic or cresol resin modified by alkylbenzenes, such as xylene, mesitylene and the like, phenolic or cresol resin modified by nitrile rubber and other rubbers. When such thermosetting resin is not used, although it is possible to enhance the sulfur-crosslinkage density and to prolong the scorch time by the use of vulcanizer, it is difficult to obtain a vulcanizate having a dynamic modulus of not less than 300 kg/cm$^2$, and even if a vulcanizate having such high dynamic modulus could be obtained, the vulcanizate is often poor in the other physical properties, such as strength and elongation at break, tear strength and the like. The thermosetting resin is generally used in an amount of 5–30 parts by weight, preferably 8–25 parts by weight, particularly preferably 10–20 parts by weight, based on 100 parts by weight of rubber. When the thermosetting resin is used in an amount of less than 5 parts by weight based on 100 parts by weight of rubber as in the case of commonly used rubber compounding, the resin is very poor in the effect for improving the dynamic modulus of vulcanizate.

As described above, although there have been commonly used N,N'-dithiodiamine or its derivative as a vulcanizer for rubber and thermosetting resin as a compounding ingredient for rubber in the rubber industry, the effects of N,N'-dithiodiamine and thermosetting resin in the present invention are entirely different from those in conventional rubber industry.

The curing agent to be used in the present invention is a necessary component for curing the thermosetting resin, and includes any curing agents, such as hexamethylenetetramine and the like, which are commonly used for curing thermosetting resin. The curing agent is used in an amount of 0.5–5 parts by weight based on 100 parts by weight of rubber. The use of the curing agent in an amount of less than 0.5 part by weight is insufficient in the curing action for the resin. While, even when the curing agent is used in an amount of more than 5 parts by weight, the curing action of the agent hardly increases.

Further, in the present invention, commonly used compounding ingredients for rubber, such as reinforcing agent, filler, antioxidant, vulcanization accelerator, vulcanization promoter, softener, plasticizer, binder, peptizer and the like, may be compounded to rubber in addition to the above described compounding ingredients.

When the rubber composition obtained by compounding the above described ingredients is vulcanized in a conventional manner, a vulcanized rubber having a dynamic modulus of not less than 300 kg/cm$^2$ can be obtained. When the rubber is used as a bead filler rubber of a tire, the ride feeling of the tire can be improved.

That is, a conventional radial tire comprises a carcass ply usually composed of 2 plies having reinforcing cords arranged at an angle of about 90° to the equatorial plane of the tire, the both ends of the carcass ply being wound about bead wires to form turn-up portions extending up to the middle portion of the sidewall of the tire, and a belt layer having reinforcing cords, which have a high modulus, such as steel cords, and are arranged in the crown portion of the carcass. In the conventional radial tire, it has been attempted that a relatively rigid bead filler rubber is filled in a space formed between the carcass ply and the turn-up portion thereof to improve the rigidity in the transverse direction of the tire, whereby the cornering performance of the tire is improved. However, when a tire, wherein the height of the turn-up end of a carcass ply is high, is used and a bead filler rubber is filled in a space formed between the carcass ply and the high turn-up portion thereof, the tire cannot satisfactorily buffer the impact subjected to the tire at the travelling on the road. Therefore, radial tires having a conventional structure is very poor in the ride feeling.

On the contrary, when the rubber composition according to the present invention is filled as a bead filler rubber in a space formed between the carcass ply of a tire and the turn-up portion thereof, the height of the turn-up end can be made low, and the vibration due to the impact subjected to the tread portion of the tire can be buffered by the sidewall and the vibration can be effectively absorbed and damped in that region of the sidewall which is near the bead portion, and tires having an improved ride feeling can be obtained.

Accordingly, the second aspect of the present invention is the provision of a radial tire comprising a carcass ply having reinforcing cords arranged at an angle of about 90° to the equatorial plane of the tire, the both ends of the carcass ply being wound about the bead wires to form turn-up portions and secured to bead portions, an improvement comprising the above described super rigid rubber composition arranged in a space formed between the carcass ply and the turn-up portion thereof and forming a bead filler rubber directed towards the sidewall of the tire.

The following examples are given for the purpose of illustration of this invention and are not intended as limitations thereof. In the examples, parts mean parts by weight.

EXAMPLE 1

Natural rubber or a rubber blend of natural rubber and cis-1,4-polybutadiene was used as a rubber, and the ingredients shown in the following Table 1 were kneaded by means of a Banbury mixer according to the compounding recipe shown in Table 1 to obtain a rubber composition. The scorch time of the rubber composition was measured by means of a rheometer. Then, the rubber composition was vulcanized at 145° C. for 25 minutes in a press to obtain a vulcanized rubber sheet having a thickness of 1 mm. The 50% modulus and dynamic modulus of the rubber sheet were measured. The obtained results are shown in Table 1. In Table 1, the dynamic modulus was measured at room temperature by vibrating a strip-shaped sample having a length of 25 mm, a width of 5 mm and a thickness of 1 mm under a frequency of 10 Hz and a dynamic strain of 2% while elongating the sample by 5% under a static strain, by means of a high-power spectrometer made by Iwamoto Seisakusho.

TABLE 1

| Sample No. | Rubber according to this invention | | | | | | | Comparative rubber | | |
|---|---|---|---|---|---|---|---|---|---|---|
| | 1 | 2 | 3 | 4 | 5 | 6 | 7 | 1 | 2 | 3 |
| Compounding recipe (parts) | | | | | | | | | | |
| Natural rubber | 100 | 50 | 100 | 100 | 100 | 100 | 50 | 100 | 100 | 100 |
| Cis-1,4-polybutadiene | — | 50 | — | — | — | — | 50 | — | — | — |
| Carbon black | 70 | 70 | 70 | 70 | 70 | 70 | 80 | 70 | 70 | 70 |
| Phenyl-β-naphthylamine | 1 | 1 | 1 | 1 | 1 | 1 | 1 | 1 | 1 | 1 |
| Stearic acid | 2 | 2 | 2 | 2 | 2 | 2 | 2 | 2 | 2 | 2 |
| Zinc white | 10 | 10 | 5 | 5 | 5 | 5 | 10 | 5 | 5 | 5 |
| Aromatic oil | — | 2 | — | — | — | — | 2 | — | — | — |
| Sulfur | 6 | 6 | 6 | 6 | 6 | 6 | 6 | 6 | 6 | 6 |
| Vulcanization accelerator | 2.3 | 1.5 | 1.3 | 1.3 | 1.3 | 1.3 | 1.3 | 1.3 | 1.3 | 1.3 |
| N,N'-Dithio-bis(morpholine) | 4 | 4 | 4 | 2 | 4 | 6 | 4 | — | 4 | — |
| Modified phenolic resin | 18.4 | 15.0 | 9.2 | 18.4 | 18.4 | 18.4 | 18.4 | — | — | 18.4 |
| Hexamethylenetetramine | 1.8 | 1.5 | 0.8 | 1.6 | 1.6 | 1.6 | 1.6 | — | — | 1.6 |
| Physical properties | | | | | | | | | | |
| Scorch time by rheometer (min.) | 5.00 | 3.15 | 3.20 | 3.45 | 4.0 | 4.25 | 3.20 | 2.75 | 4.30 | 2.80 |
| 50% Modulus (kg/cm$^2$) | 98 | 85 | 114 | 82 | 87 | 91 | 98 | 56 | 79 | 90 |
| Dynamic modulus (kg/cm$^2$) | 1,151 | 304 | 730 | 966 | 866 | 885 | 584 | 147 | 290 | 892 |

As seen from Table 1, only when N,N'-dithiobis(morpholine), a thermosetting resin and a curing agent are used at the same time, a super rigid rubber composition aimed in the present invention, which has such a long scorch time that does not deteriorate its workability and processability and a high dynamic modulus of not less than 300 kg/cm$^2$ in the vulcanizate, can be obtained. A rubber composition having a scorch time by rheometer of not shorter than 3 minutes can be used for practical purpose.

The scorch time by rheometer of a rubber composition is a time required for the rubber composition to increase its torque by two rheometer units from the minimum value when the torque is measured at 145° C. by means of a rheometer (Model MP) made by Monsanto, Co., U.S.A. In the present invention, this scorch time was used as a measure of scorching of rubber composition.

EXAMPLE 2

A super rigid rubber composition according to the present invention or a conventional rubber composition was used as a bead filler rubber of a radial tire having a size of 165 SR 13, and the ride feeling of the tire was examined by the road test.

The structure of the tire used in the test is illustrated in the accompanying single FIGURE. Referring to the FIGURE, a tire 1 has a belt layer 2 consisting of two plies of steel cord layers, and a carcass ply 3, the both ends of which are wound about bead wires to form turn-up portions 3' and secured to bead portions 4. In the FIGURE, numeral 5 represents a sidewall, numeral 6 represents a bead riller rubber, R represents a rim, and T represents the upper end of the turn-up portion 3' of the carcass ply 3.

In the above test, four kinds of sample tires having different structures were used, which had been produced by combining the following conditions with respect to the kind of carcass ply (a, b), the height of turn-up portion 3' of carcass ply (y, z) and the kind of rubber composition (α, β, γ).

a: One ply of polyethylene terephthalate fiber cord (1,500d/2).
b: One ply of rayon cord (1,650d/3).

y: The turn-up portion 3' of the carcass ply is extended up to the vicinity of the rim flange $R_T$ in the bead portion 4.

z: The turn-up portion 3' of the carcass ply is extended up to the middle portion W—W of the sidewall of the tire.

α: Sample No. 1 rubber according to the present invention shown in Table 1, which has a dynamic modulus of 1,151 kg/cm$^2$, is used as a bead filler rubber 6 and extended in a tonguelike shape up to the vicinity of the middle portion W—W of the sidewall.

β: Sample No. 2 rubber according to the present invention shown in Table 1, which has a dynamic modulus of 304 kg/cm$^2$, is used as a bead filler rubber 6 and extended in a tonguelike shape up to the vicinity of the middle portion W—W of the sidewall.

γ: Sample No. 1 comparative rubber shown in Table 1, which has a dynamic modulus of 147 kg/cm$^2$, is used as a bead filler rubber 6 and extended in a tongue-like shape up to the vicinity of the middle portion W—W of the sidewall.

The four kinds of sample tires are as follows.

| Tire A(a,y,α) | Tire according to the present invention |
|---|---|
| Tire B(a,y,β) | Tire according to the present invention |
| Tire C(a,z,γ) | Conventional tire |
| Tire D(b,y,γ) | Conventional tire |

The ride feeling of the sample tires were compared with each other by the impact index and damping index measured in the following manner.

A tire was travelled at a usual speed of 50 kg/hr on a road having rubber projections of 10 mm height fixed thereto, and the vibration subjected to the tire in the up-and-down direction was measured in the form of a reaction in the rotating shaft of the tire by means of an acceleration meter. The impact absorbing property of a sample tire was estimated by the impact index which is the reciprocal of the ratio of the amplitude in the first period of the above measured wave shape in the sample tire to that, calculated as 100, in tire C.

The vibration damping property of a sample tire was estimated by the damping index, which is the reciprocal of the ratio of the damping coefficient calculated from the above measured wave shape in the sample tire to that, calculated as 100, in tire C.

The comparison of the sample tires in the impact index and in the damping index is shown in the following Table 2. In Table 2, a tire having larger impact index and damping index is more excellent in the ride feeling.

TABLE 2

| Property | Sample tire | | | |
|---|---|---|---|---|
| | A | B | C | D |
| Impact index | 110 | 115 | 100 | 105 |
| Damping index | 120 | 112 | 100 | 88 |

It can be seen from Table 2 that tires A and B using the rubber composition according to the present invention are remarkably superior to tire C using conventional rubber composition in the impact absorbing property and in the vibration damping property.

Further, even in tire D, wherein the turn-up end of carcass ply is located at a low position similarly to tires A and B and a conventional rubber composition is used as a bead filler rubber, the impact absorbing property is improved, but tire D is poor in the vibration damping property. That is, vibration remains in tire D without damping.

As described above, when the super rigid rubber composition according to the present invention is used as a bead filler rubber, the turn-up end of a carcass ply can be located at a low position near the rim flange. Therefore, in the tire according to the present invention, the upper portion of the sidewall acts as a reflex region, and the portion of the sidewall near the bead portion acts as a damping region of vibration, and moreover the portion of the sidewall near the bead portion has been effectively reinforced. Accordingly, the tire of the present invention has an improved ride feeling without deteriorating the cornering performance, which is a property incompatible with the ride feeling.

What is claimed is:

1. In a radial tire comprising a carcass ply having reinforcing cords arranged at an angle about 90° to the equatorial plane of the tire, both ends of the carcass ply being wound about bead wires to form turned-up portions and being secured to bead portions, the improvement wherein the radial tire has an improved ride feeling and comprises a vulcanized super rigid rubber composition having a dynamic modulus of 500 to 1,500 kg/cm² arranged in a space formed between the carcass ply and the turned-up portion thereof and forming a bead filler rubber directed towards the sidewall of the tire wherein the super rigid rubber composition is produced from a composition comprising a sulfur-vulcanizable rubber selected from the group consisting of natural rubber, a diene series rubber, a diene series copolymer rubber and rubber blends thereof in an optional mixing ratio, elementary sulfur, N,N'-dithiodiamine or a derivative thereof which is a vulcanizer in addition to the elementary sulfur and is represented by the general formula

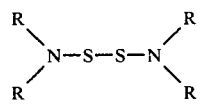

wherein

represents an alkylamino, arylamino, aryalkylamino, cycloalkylamino, cyanoalkylamino, cyanocycloalkylamino or heterocycloamino group having 1–16 carbon atoms, a thermosetting resin and a curing agent for said thermosetting resin, wherein the super rigid rubber composition is produced from a composition comprising 0.1–8 parts by weight of said N,N-'dithiodiamine or a derivative thereof, 5–30 parts by weight of said thermosetting resin and 0.5–5 parts by weight of said curing agent, based on 100 parts by weight of said rubber.

2. The radial tire according to claim 1, wherein the rubber is cis-1,4-polybutadiene or cis-1,4-polyisoprene.

3. The radial tire according to claim 1, wherein the rubber is styrene-butadiene copolymer rubber.

4. The radial tire according to claim 1, wherein the bead filler rubber is extended in a tonguelike form up to the vicinity of the middle portion of the sidewall.

5. The radial tire according to claim 1, wherein the turned-up portion of the carcass ply is extended up to the vicinity of the rim flange in the bead portion.

6. The radial tire according to claim 1, wherein the super rigid rubber composition is produced from a composition consisting essentially of the recited components.

7. The radial tire according to claim 4, wherein the upper portion of the sidewall acts as a reflex region, the portion of the sidewall near the bead portion acts as a vibration damping region and the portion of the sidewall near the bead portion also is reinforced.

8. The radial tire according to claim 1, wherein the super rigid rubber composition has a dynamic modulus of from 700 to 1,500 kg/cm².

* * * * *